June 24, 1947.  J. A. JOHNSON  2,423,030
ELEVATOR TYPE MEANS FOR DRYING CERAMIC WARE
Filed Feb. 15, 1945  4 Sheets-Sheet 4

Inventor
J. A. Johnson

Patented June 24, 1947

2,423,030

UNITED STATES PATENT OFFICE 2,423,030

ELEVATOR TYPE MEANS FOR DRYING CERAMIC WARE

John Arthur Johnson, Brown Edge, Stoke-on-Trent, England

Application February 15, 1945, Serial No. 578,092
In Great Britain February 16, 1944

2 Claims. (Cl. 34—189)

The invention has for its object to provide improved means for use in the drying of articles of pottery or other ceramic ware after moulding or whilst still in the mould and prior to firing.

Figure 1:
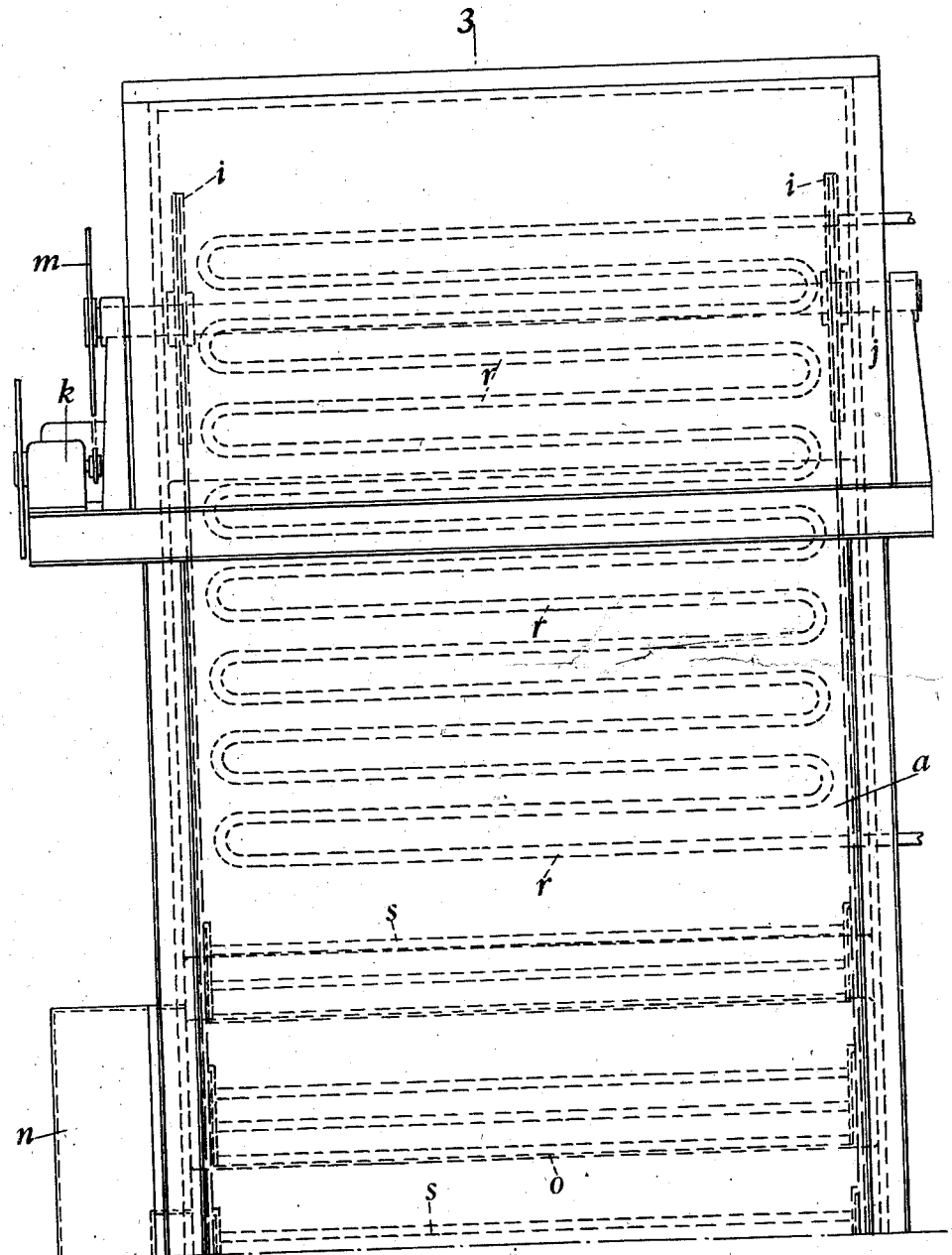
Figure 2:
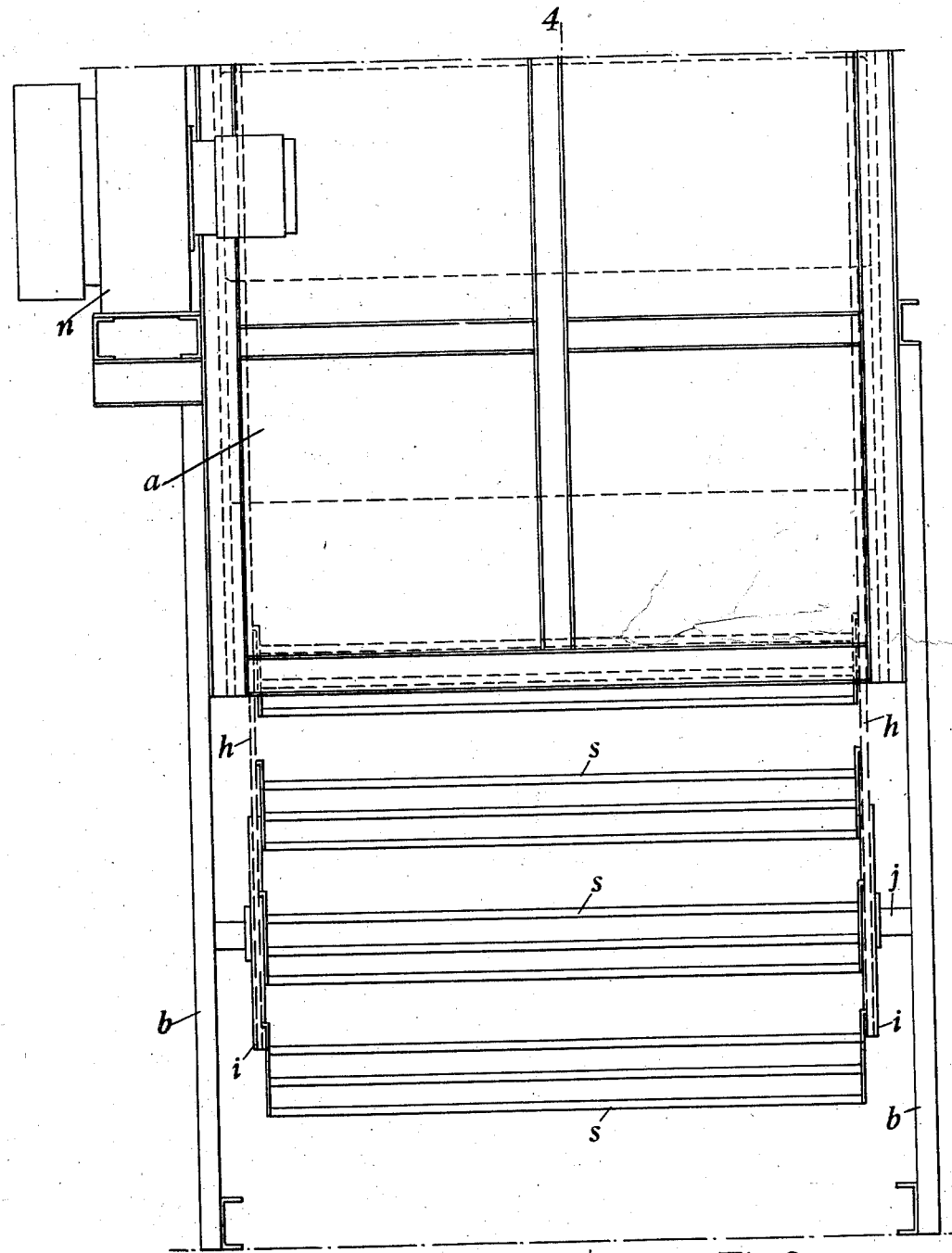

In the accompanying sheets of explanatory drawings:

Figures 1 and 2 are diagrammatic side views illustrating respectively the upper and lower parts of drying means constructed in accordance with the invention.

Figure 3:
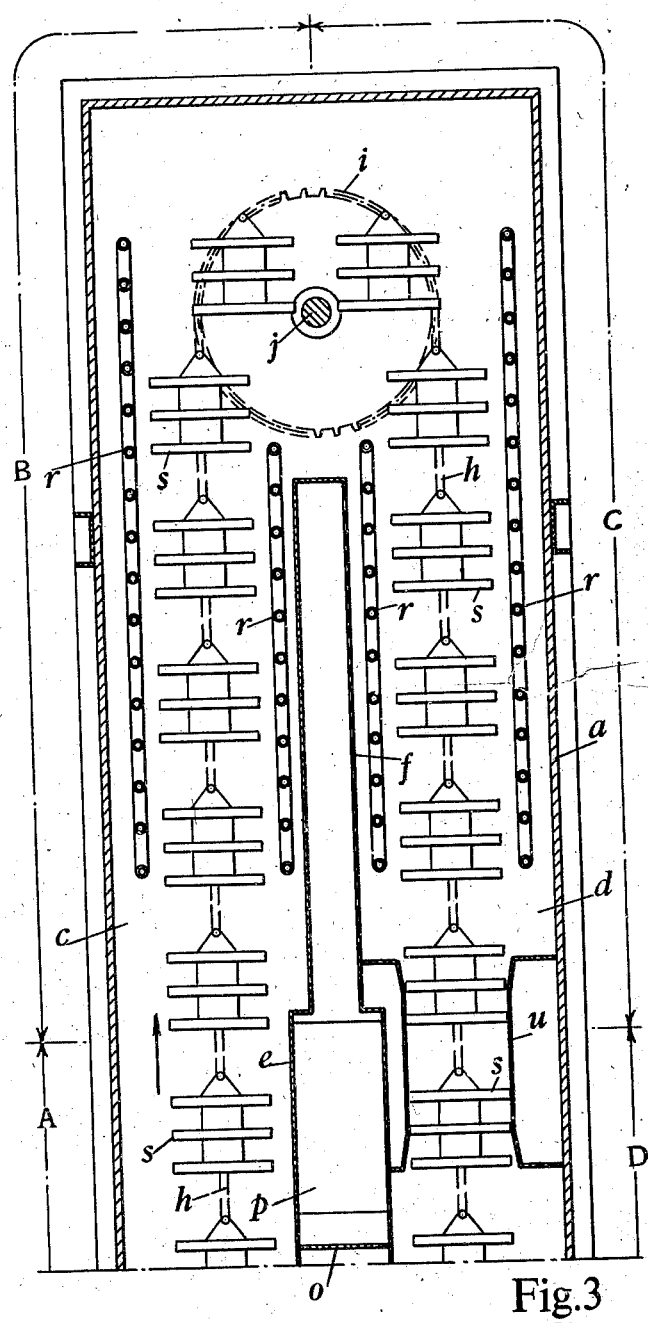
Figure 4:
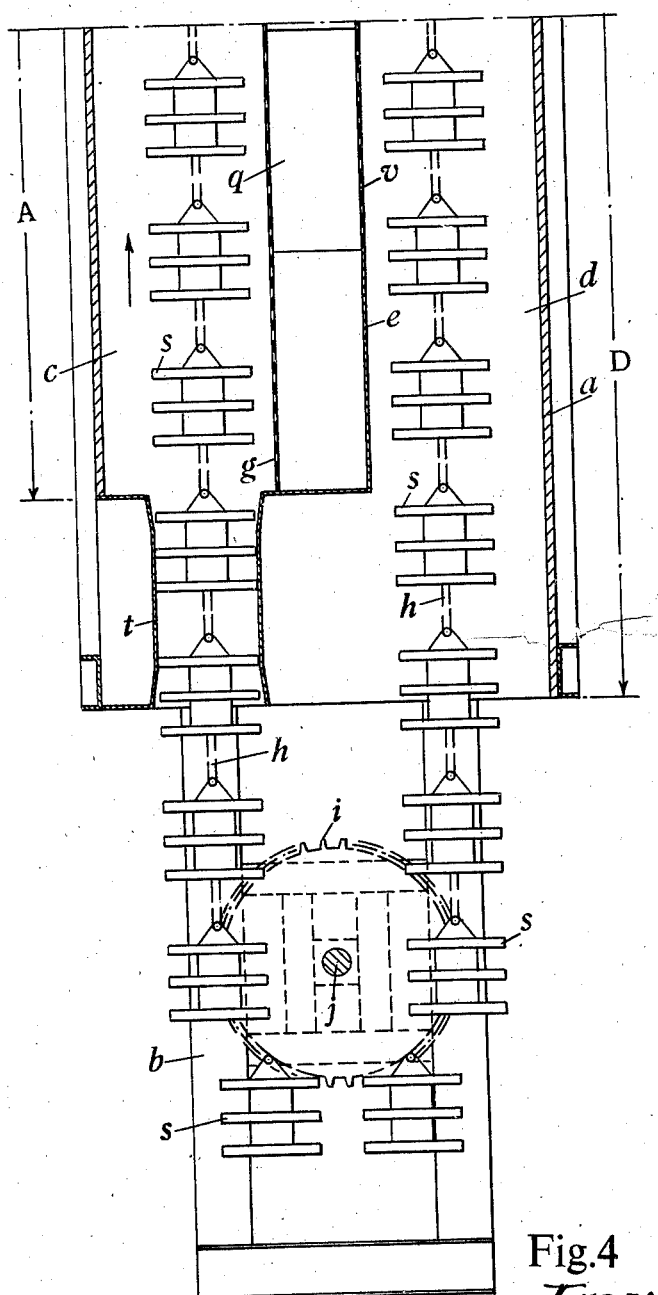

Figures 3 and 4 are diagrammatic sectional views taken respectively on the line 3—3 of Figure 1 and 4—4 of Figure 2.

In carrying the invention into effect as shown, I employ a rectangular vertical chamber $a$ of appropriate dimensions, this chamber being provided at opposite sides with supports $b$ which project from the lower end of the chamber and rest on the ground. The interior of the chamber $a$ is divided into two compartments $c$, $d$ by a centrally arranged vertical partition $e$ which extends from a position near the bottom to a position near the top of the chamber, the upper ends of the two compartments being in communication with each other through the space between upper ends of the chamber and partition. The partition $e$ is hollow and is provided with openings $f$, $g$ so that it can form part of an air circulating path within the chamber $a$, the openings $f$ being formed in one side of the upper part of the partition, and the openings $g$ being formed in the opposite side of the lower part of the partition.

Situated within the chamber $a$ and projecting from its lower end is a vertically arranged endless conveyor $h$ carried by sprockets or the like $i$ on horizontal shafts $j$. One of the shafts $j$ extends through and is rotatably supported by the sides of the chamber $a$ at a position above the upper end of the partition $e$, and the other of the shafts extends between and is rotatably carried by the supports $b$ at a position beneath the lower end of the chamber. The conveyor $h$ is movable in the direction of the arrows shown in Figures 1 and 2, and the arrangement is such that an ascending part of the conveyor is situated in the compartment $c$ and a descending part of the conveyor is situated in the other compartment $d$. Any convenient source of power, such as an electric motor $k$ mounted on the exterior of the chamber $a$ and connected through gearing $m$ to the upper shaft $j$, may be employed for driving the conveyor $h$, and the motion of the conveyor may be intermittent or continuous.

Also mounted on the exterior of the chamber $a$ is a fan $n$ for causing air to flow through the above mentioned path within the chamber, the interior of the partition $e$ being divided at a position intermediate its ends by a transverse member $o$, and being in communication at opposite sides of this member with openings $p$, $q$ leading respectively to the delivery and intake sides of the fan, so that air can be forced by the fan into the upper part of the partition, and returned to the fan through the lower part of the partition after having passed upwardly through the compartment $d$ and downwardly through the compartment $c$. The lower part of the partition $e$ may be provided with one or more dampers (not shown) to enable any portion of it to be brought into the air circulating path. Further I provide in the upper parts of both compartments $c$, $d$ of the chamber any convenient air heating means, such as steam or other hot gas pipes $r$. Alternatively the air to be circulated through the chamber $a$ may be heated by externally arranged means. In addition there may be provided in the upper part of the compartment $c$ containing the ascending side of the conveyor $h$, any convenient means (not shown) for injecting steam or water spray for humidifying the air in the chamber $a$.

The apparatus above described is such that the interior of the chamber $a$ virtually consists of four zones A, B, C and D, and the three zones A to C merge into each other gradually so as to avoid any sudden change of temperature or humidity. The disposition of the zones A to D will be easily ascertained by following the course through the chamber of the articles to be treated, the conveyor $h$ having pivoted to it multi-tier carriers $s$ on which the articles can be placed at the loading position from which the carriers are moved upwardly into the compartment $c$ through an air lock $t$ in the lower end of the chamber. The air lock $t$ consists of a short vertical tubular duct having flared ends, the carriers $s$ being adapted to fit this duct closely. After passing through the air lock $t$ the articles enter the lower part of the compartment $c$ which forms the first zone A, and whilst in this zone the articles meet a descending stream of warm air by which they are gradually heated. This air stream passes from the zone A into the lower part of the partition $e$, whence it is returned to the fan $n$. From the zone A the articles pass into the upper part of the first compartment $c$ which forms the second zone B. Here the articles still meet the descending air stream, but at a higher temperature, the transition from the lower to the higher temperature being made gradual to avoid risk of injury to the articles. In the second zone B the articles are further heated and some moisture is extracted from them. From the upper end of the first compartment $c$ the articles are carried by the conveyor $h$ to the upper end of the second compartment $d$ which forms the third zone C. While descending through the third zone C the articles meet an ascending stream of air issuing from the adjacent side of the upper part of the partition $e$, this being the hottest zone, where final drying is effected. The fourth zone D is formed by the lower part of the second compartment $d$ where the articles meet an ascending stream of cold air which is drawn in through the bottom of the chamber $a$ from the outer atmosphere. This stream enters the lower part of the partition $e$ through apertures $v$ and passes from thence to the fan $n$.

The transition from the third zone C to the fourth zone D is effected through an air lock $u$ similar to that above described. In the fourth zone D the articles are cooled down to a temperature at which they can be conveniently removed from the carriers $s$ when the latter emerge from the lower end of the chamber $a$.

The chamber $a$ is provided with any conveniently arranged outlet (not shown) through which excess air can be discharged to the outer atmosphere.

It will be understood that at any given time the conveyor $h$ is fully loaded with articles to be dried and that whilst loading takes place at one side, unloading occurs simultaneously at the other side.

By this invention I am able satisfactorily and conveniently to effect the drying of shaped pottery or other ceramic articles either in their moulds or otherwise, in a manner which minimises risk of injury by excessively rapid heating or moisture extraction. The invention is not, however, restricted to the example described as subordinate details may be modified to suit different requirements.

Having thus described my invention what I claim as new and desire to secure by Letters Patent is:

1. Means for drying ceramic ware, comprising in combination a vertical chamber, a hollow bi-compartmental partition consisting of upper and lower parts arranged in the chamber and dividing the latter into two compartments which intercommunicate at their upper ends, and which form with the hollow partition an air circulating path within the chamber, the lower part of the partition being provided with an air inlet, and the upper part being provided with an air outlet, an endless conveyor having ascending and descending parts respectively situated in the two compartments, and means communicating with the air inlet and outlet of the partition for causing heated air to flow through the upper part of the partition to the compartment containing the descending part of the conveyor, from this compartment to and downwardly through the other compartment, and from the latter compartment into the lower part of the partition, the upper part of the partition being provided at the side adjacent to the compartment containing the descending part of the conveyor with air outlet openings, and the lower part of the partition being formed at the opposite side with air inlet openings.

2. Means as claimed in claim 1 and having an air lock through which the ascending part of the conveyor enters the lower end of the corresponding compartment, and another air lock through which the descending part of the conveyor passes at a position between the ends of the corresponding compartment.

JOHN ARTHUR JOHNSON.

REFERENCES CITED

The following references are of record in the file of this patent:

UNITED STATES PATENTS

| Number | Name | Date |
|--------|------|------|
| 1,767,872 | Fox | June 24, 1930 |
| 1,934,904 | Barnett et al. | Nov. 14, 1933 |
| 2,257,180 | Mayer | Sept. 30, 1941 |
| 1,893,963 | Russ | Jan. 10, 1933 |

FOREIGN PATENTS

| Number | Country | Date |
|--------|---------|------|
| 439,577 | Great Britain | Dec. 10, 1935 |